May 31, 1927.
W. J. KRAUSE
1,630,491
SHORT CIRCUITING DEVICE
Filed June 13, 1924
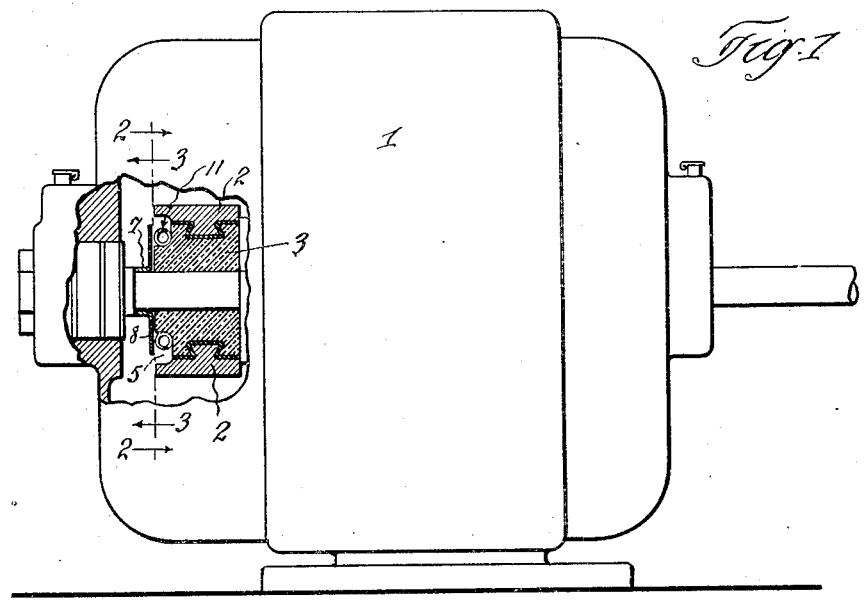
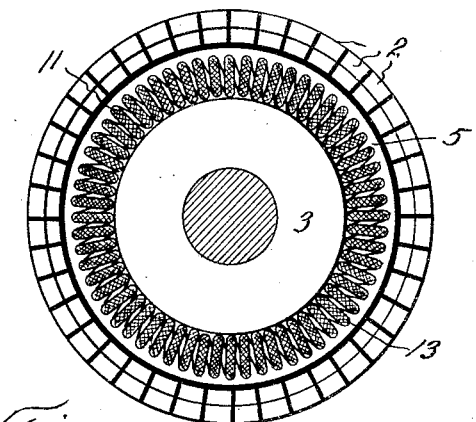
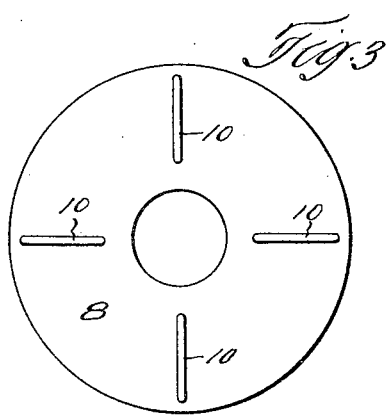
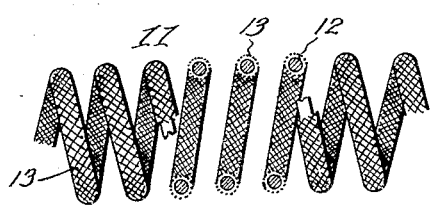
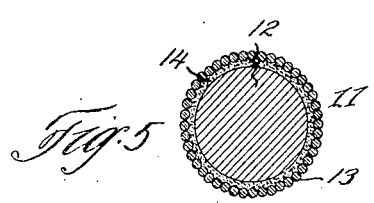
Inventor.
Walter J. Krause
By Hull, Brock & West
Attys.

Patented May 31, 1927.

1,630,491

UNITED STATES PATENT OFFICE.

WALTER J. KRAUSE, OF CLEVELAND, OHIO, ASSIGNOR TO THE OHIO ELECTRIC & CONTROLLER COMPANY, OF CLEVELAND, OHIO, A CORPORATION OF OHIO.

SHORT-CIRCUITING DEVICE.

Application filed June 13, 1924. Serial No. 719,871.

This invention relates to a centrifugally operated short circuiting device that is adapted particularly for alternating current motors of the so-called repulsion induction type which start as repulsion motors and then run as induction motors, the device being utilized to short circuit the commutator bars to which the rotor coils are connected.

The objects in view are to provide an exceedingly simple and inexpensive centrifugally operated short circuiting device for the commutator bars of motors of the type above referred to, and which device is highly efficient, is very durable, and is of such a nature as will afford a very effective contact with the commutator bars.

Briefly, the invention consists in extending the commutator bars beyond the adjacent end portion of the commutator core and disposing between said portion of the core and an opposed member or plate a short circuiting device comprising an endless helical spring of suitable wire, such as steel piano wire, enclosed within a jacket of comparatively small braided wire of suitable conductive metal, such as copper, and, if desired, inserting a layer of cotton thread or the like between the spring wire and jacket. Preferably, the aforesaid member or plate incorporates means for transmitting its rotary motion to the short circuiting device.

With such an arrangement, when the rotor attains a given speed, the short circuiting device expands under centrifugal force and contacts with the overhanging ends of the commutator bars thereby to electrically connect them.

Apparent from the foregoing are the further objects of utilizing a material for the spring which is highly resilient without regard for its efficiency as an electrical conductor; and using a highly conductive material for short circuiting the commutator bars and which, of itself, may possess little or no resiliency. This arrangement relieves the spring of having to carry current, which is liable to destroy its resilient properties, and by insulating the conductive material from the spring, as above mentioned, this safeguarding of the spring against deterioration is increased.

Objects additional to those above enumerated will appear as I proceed to describe the invention with reference to the accompanying drawing wherein Fig. 1 is a side view of a motor, partly in section, embodying the invention; Figs. 2 and 3 are sections on the line x—x of Fig. 1, Fig. 2 being taken as though looking in the direction of the arrows designated 2, while Fig. 3 is taken as though looking in the opposite direction, as indicated by the arrows 3; Fig. 4 is an enlarged detail, partly in section, of the short circuiting device; and Fig. 5 is a greatly enlarged cross section through the jacketed spring wire.

The motor 1, which may be of any approved construction in the class of motors referred to, incorporates the usual commutator comprised of bars 2 that are carried by the commutator core 3, the bars being insulated from each other and from the core and suitably connected to the coils of the rotor in the customary way. The front end of the core 3, adjacent its periphery, is reduced in diameter to provide an annular recess 5 which is overhung by the extended outer ends of the commutator bars 2. Pressed upon, or otherwise secured to, the rotor shaft 6 is the flanged hub 7 of a plate or member 8, said plate or member serving to close the recess 5 and extending to within a comparatively short distance of the commutator bars. The member or plate 8 is shown as provided with a series of inwardly projecting radially disposed ribs or beads 10 for a purpose which shall presently appear.

The short circuiting device, designated generally by the reference character 11, is made up of a spiral spring 12 that is formed from suitable wire, as steel piano wire of the proper gauge, and encasing the wire 12 is a jacket 13 of suitable conductive material, such as relatively thin copper wire. The jacket 13 may be woven in tubular form and then applied to the wire 12, or it may be woven directly upon the wire, and between the wire 12 and the jacket there may be a layer 14 of suitable insulating material, such as cotton thread, as shown in Fig. 5. After these parts are assembled, the wire is given its helical form, and the opposite ends of wire 12, and of the jacket 13, may be suitably connected together, as by welding, so that the spring, with its encasing jacket is made endless to constitute an annulus which is free to expand and contract in a manner hereinafter to be described.

When the rotor is at rest, the short circuiting device occupies the position shown in the drawings and is contracted under a certain degree of tension about the reduced end of the core 3, the device fitting with a reasonable degree of closeness between the plate or member 8 and the opposed wall of the recess 5.

Assuming that the commutator is engaged by the usual brushes (not shown) and that the motor is in circuit with a source of electric energy, the motor will start as a repulsion motor. As the rotor begins to turn the short circuiting device will, of course, turn with it, the device being prevented from slipping in a circumferential direction, should it have a tendency to do so, by the ribs or beads 10 of the plate or member 8. As the speed increases, centrifugal force is built up within the short circuiting device until such force overcomes the tension of the spring 12. The tension of the spring, however, resists expansion until just before the rotor reaches the speed at which the short circuiting should be effected. When the rotor reaches this predetermined speed, the short circuiting device flies out into contact with the overhanging ends of the commutator bars, short circuiting the bars, and immediately converting the motor from a repulsion motor to one operating on the induction principle. The speed at which the short circuiting occurs depends, of course, on the mass of the spring with its enclosing jacket and the normal tension of the spring. When the motor is stopped, the short circuiting device automatically contracts, assuming normal position.

The fact that the jacket 13 is capable of yielding somewhat with respect to the wire 12, being, in the preferred form, backed up by the layer 14 of comparatively soft material, greatly enhances the character of the contact between the short circuiting device and the commutator bars, the jacket 13 flattening out, so to speak, and making contact of perceptible breadth. Furthermore, contact is made at a series of points with each commutator bar, due to the individual strands from which the jacket 13 is woven.

Having thus described my invention, what I claim is:—

1. A short circuiting device for motors of the class described comprising an endless helical spring having a layer of cotton thread thereover and a jacket of relatively thin copper wire covering said cotton thread.

2. A short circuiting device for motors of the class described comprising an endless helical steel wire spring and a jacket of braided copper wire covering said spring and a layer of insulating material between the jacket and wire.

3. A short circuiting device for motors of the class described comprising a helical wire spring having a jacket of highly conductive material encasing the same and a layer of insulating material disposed between the wire spring and the jacket, the opposite ends of said wire spring and jacket being connected together whereby the spring and its encasing jacket are made endless to constitute an annulus which is free to expand and contract.

In testimony whereof, I hereunto affix my signature.

WALTER J. KRAUSE.